United States Patent [19]

Gobran

[11] 4,032,486

[45] * June 28, 1977

[54] ADHESIVES TACKIFIED WITH PHENOL-DIENE-OLEFIN ADDUCTS HAVING NUMBER AVERAGE MOLECULAR WEIGHT BETWEEN ABOUT 600 TO 6000

[75] Inventor: Ramsis Gobran, Roseville, Minn.

[73] Assignee: Minnesota Mining and Manufacturing Company, St. Paul, Minn.

[*] Notice: The portion of the term of this patent subsequent to Aug. 24, 1993, has been disclaimed.

[22] Filed: Oct. 23, 1973

[21] Appl. No.: 408,592

[52] U.S. Cl. .................. 260/4 AR; 260/47 UA; 260/62; 260/859 R; 260/887; 260/888; 260/889; 260/890; 428/261; 428/491; 428/500
[51] Int. Cl.$^2$ .................. C08L 7/00; C09J 3/12
[58] Field of Search ............ 260/62, 5, 47 UA, 3, 260/878 R, 887, 858; 526/263, 264; 428/261

[56] References Cited

UNITED STATES PATENTS

| | | | |
|---|---|---|---|
| 2,558,812 | 7/1951 | Bloch | 260/62 |
| 3,124,555 | 3/1964 | Bown et al. | 260/62 X |
| 3,251,808 | 5/1966 | Koupp et al. | 260/62 |
| 3,347,935 | 10/1967 | Koupp et al. | 260/619 B |
| 3,383,362 | 5/1968 | Gonzenbach | 260/62 |
| 3,491,167 | 1/1970 | Soldatos | 260/62 |
| 3,796,687 | 3/1974 | Collette et al. | 260/47 UA |
| 3,976,606 | 8/1976 | Gobran | 260/47 UA |

FOREIGN PATENTS OR APPLICATIONS

| | | |
|---|---|---|
| 1,694,829 | 3/1972 | Germany |
| 2,262,158 | 7/1973 | Germany |

*Primary Examiner*—Harry Wong, Jr.
*Assistant Examiner*—Peter F. Kulkosky
*Attorney, Agent, or Firm*—Cruzan A. Alexander; Donald M. Sell; Richard Francis

[57] ABSTRACT

Adhesive compositions having a high degree of adhesive tack are provided by certain rubbery materials which are blended with a phenol-diene-olefin resinous reaction product.

12 Claims, No Drawings

ADHESIVES TACKIFIED WITH PHENOL-DIENE-OLEFIN ADDUCTS HAVING NUMBER AVERAGE MOLECULAR WEIGHT BETWEEN ABOUT 600 TO 6000

BACKGROUND OF THE INVENTION

The present invention relates to tackified adhesive compositions, particularly to such compositions tackified with a phenol-diene-olefin resinous reaction product.

It has been the general practice in the manufacture of adhesives form elastomeric materials, such as natural rubber, polyisoprene, cis-polybutadiene, styrene-butadiene rubbers, ethylene-propylene rubbers, and the like, to mix with the elastomers, a tackifying agent sometimes merely called a tackifier. The tackifying agent is added to the elastomer to enable the normally weakly tacky or non-tacky elastomers to become tacky, i.e., to be capable of adhering to a surface with the application of very little or no pressure.

For the most part, the tackifiers for elastomers are rosin, modified rosins, polyterpene resins and coumarone-indene resins. Other resins of importance are the reaction products of alkylphenols with acetylene and the reaction products of phenols with aldehydes.

Of particular importance in the manufacture of adhesives from natural and synthetic rubbers has been the terpene resins. The resins prepared from β-pinene have been especially important in the manufacture of adhesives. The use of β-pinene in the manufacture of tackifiers for adhesives, however, has become restricted because of its limited supply and because of the growing use of β-pinene in other fields. Terpenes therefore have been extended for use as tackifiers by reaction with phenols.

U.S. Pat. No. 3,383,362 discloses reacting phenols with cyclic polyolefin and terpene, sesquiterpene, dihydroterpene or a low molecular weight propylene polymer to produce tackifiers. Such tackifiers, however, require large amounts of the expensive terpenes. Tackifiers from rosin, modified rosins, coumarone-indene resins and phenol condensation products with acetylene and aldehydes, furthermore have not adequately provided replacement for polyterpene resins because they have a variety of deficiencies. For example, some fail to produce a sufficiently high degree of tack, others are too expensive, and still others are chemically unstable.

Low molecular weight reaction products of phenols and dienes are known but not in forms which are suited for use as tackifers. U.S. Pat. No. 3,336,398, for example, discloses the reaction of phenols with a diene, i.e., dicyclopentadiene, at temperatures which converts the dicyclopentadiene to a conjugated cyclodiene, producing a product having ethylenic unsaturation. Such unsaturated materials are not chemically stable.

U.S. Pat. No. 2,471,454 teaches dihydroterpene-substituted phenol compounds rather than diene-substituted phenols, requiring expensive terpenes as a starting material. U.S. Pat. No. 2,864,868 discloses the reaction product of conjugated dienes with phenols to produce hard, dark resinous products having blocks of polymerized diene and also having ethylenic unsaturation. As well as being chemically unstable, such products are not compatible with some elastomers.

SUMMARY OF THE PRESENT INVENTION

According to the present invention, it has been found that an unanticipated high degree of adhesive tack can be obtained in novel adhesive compositions comprised of certain rubbery materials, particularly natural rubber and polybutadienes, which are tackified with the resinous reaction product of a phenol, a non-conjugated diene and an olefin.

The adhesive compositions of the invention are relatively inexpensive to produce, chemically stable, and have an excellent balance of adhesion, cohesion, tackiness and strength. They provide superior structural adhesives and excellent adhesives for applying to backings providing excellent pressure-sensitive adhesive tapes.

The tackifier resin is produced by reacting certain phenolic compounds with non-conjugated dienes in the presence of a Friedel-Crafts catalyst, and reacting the resultant product with an olefinic compound having a single double bond. The preferred ratio of reactants is 2 moles of the phenol, 1 mole of diene and 1 to 4 moles of the olefin.

The phenol has at least 2 ortho and/or para positions free for reaction, and may be alkylated, i.e., contain one or more straight-chain or branched alkyl groups, preferably with less than 15 carbon atoms. Exemplary phenols which may be used in the preparation of the tackifier resin include phenol, anisol, o-, m-, or p- cresol, napthol, o- or p-t-butyl phenol, octylphenol, and bisphenols such as bisphenol A and bisphenol B.

The non-conjugated diene used in the reaction to produce the tackifier resin for the compositions of the invention is characterized by having at least two loci of unsaturation, e.g., two double bonds, that are separated by a saturated moiety which effectively prevents conjugation. Suitable dienes of this type include dicyclopentadiene, 4-vinylcyclohexene-1, dipentene, 1,5-cyclooctadiene, etc. For the purpose of the present invention, the term "non-conjungated diene" also encompasses trienes which will have, as specified above, at least two loci of unsaturation that are separated by a saturated moiety which effectively prevents conjugation. A triene which is useful in the present invention is 1,5,9-cyclododecatriene.

The olefins which are used in the reaction to prepare the tackifier resin for the compositions of the invention include such compounds as styrene, α-methylstyrene, chlorostyrene, vinyltoluene, t-butylstyrene, hexene-1, hexene-2, octene-1, 2-ethylhexene-1, indene, cyclohexene, methyl vinyl ether, isobutyl vinyl ether, allyl propyl ether, methyl cinnamate, dimethyl fumarate, N-vinylpyridine, N-vinylpyrrolidone, and N-vinylcarbazole.

As previously stated, the reaction to produce the tackifier resin is carried out in the presence of a Friedel-Crafts catalyst. Useful catalysts include acids, e.g., hydrofluoric acid, sulfuric acid, or phosporic acid, or a Lewis acid such as aluminum chloride, aluminum bromide, boron trifluoride, boron trifluoride ether and acid complexes, beryllium chloride, ferric chloride, zinc chloride, etc. Boron trifluoride and the ether and acid complexes thereof are the preferred catalysts.

The amount of catalyst required, functionally stated, is that amount sufficient to cause the reaction to go to completion to produce the resin. This amount will generally be about 1–3% of the weight of the reactants and exclusive of the weight of the catalyst.

In the reaction, 2 moles of the phenol should be employed for each mole of diene. Once the phenol and diene are reacted, producing a ternary adduct, 1 to 4 moles of the olefin is then reacted with the adduct. The amount of olefin used will depend upon the number of reactive sites remaining in the adduct. If a substituted phenol has been used, such as one having only two reactive sites, only two reactive sites will remain after the reaction with the diene. Therefore, only two moles of olefin can be combined with the adduct to form the resin, more merely providing an excess which must be removed.

The order of adding the reactants is important to produce the desired product. The phenol should always be in an excess during the first reaction, else homopolymerization of the diene results rather than production of the ternary adduct. An excess of phenol can be maintained by charging the reaction vessel therewith, adding the catalyst, and then slowly adding the diene with sufficient agitation to cause rapid dispersal. The olefin is then slowly added to the reaction mixture, maintaining an excess of the adduct to prevent homopolymerization of the olefin.

The reaction can be carried out at atmospheric pressure but care should be taken to substantially exclude moisture, e.g., by purging the reaction vessel with a dry inert gas. The preferred reaction atmosphere is dry argon or nitrogen.

For convenience in handling and reaction control, the reactants may be mixed with an inert liquid reaction medium at about 10 to 40 parts by weight reactants per 100 parts total (reaction medium plus reactants), preferably about 15 to 30 per 100. The preferred reaction medium is also a solvent for at least one of the reactants. Exemplary reaction media include aromatic hydrocarbons such as toluene and xylene, aliphatic hydrocarbons such as heptane and hexane, and halogenated hydrocarbons such as chlorobenzene and dichlorobenzene.

The reaction temperature is maintained preferably between room temperature (about 20° C) and 130° C, although slightly higher and slightly lower temperatures may also be effective. At temperatures above about 130° C chemical modification of some of the dienes will occur, causing them in some cases to convert to conjugated dienes. Therefore, temperatures substantially above 135° C should be avoided where appropriate.

The most convenient method of accomplishing the reaction is to charge the phenol, the reaction medium (if used) and the catalyst into a suitable reaction vessel — and, with mixing, dropwise add the diene. The reaction will be exothermic and care should be taken to maintain the reaction mixture at a temperature of less than about 130° C. Such a result can easily be accomplished by very slow addition of the diene or by cooling the reaction vessel contents. After the addition of the diene is completed, heating at about 130° C and agitation are continued until the reaction is complete. Reaction completion is generally achieved within 2 to 4 hours.

After the initial reaction of the phenol and the diene, reaction with the olefin may be accomplished by very slow addition thereof to the phenol-diene reaction product with agitation, care being taken to maintain the temperature below 130° C. This second reaction is generally completed in about 1 to 4 hours after complete addition of the olefin to the previous reaction product.

Once the second reaction is complete, the product can be isolated, for example, by distillation of the catalyst, reaction medium (if used), unreacted materials, and low molecular weight products. Non-volatile catalysts or residues can be removed by methods known in the art, e.g., extraction, or they may be left in the product, if they are inert (or can be rendered inert) with respect to the materials with which they will eventually be used.

The tackifier resin prepared as described above ranges in color from light amber to dark brown. The resin may be a viscous liquid, a tacky solid material, or a friable solid, or somewhere therebetween, depending upon the reactants going to produce it. The molecular weight of the resin will vary from about 600 to about 6000 or more, also depending upon the starting materials. It is preferred that the molecular weight be in excess of 600 since at lower molecular weight excessive plasticizing of rubbery compositions is produced, and while this may be useful for some purposes, it is generally not desired.

The tackifier resin described above can be blended with rubbery materials by using conventional rubber compounding equipment and techniques. Generally, about 5 to 200 parts by weight of the tackifier resin is used per 100 parts rubber (preferably 40 to 100 parts tackifier to 100 parts rubber).

The most preferred tackifier is partially or fully hydrogenated, since it will be even more compatible with a wider variety of rubbery materials to be tackified. In the partially hydrogenated tackifier resin, at least half, but not substantially all of the hydrogenatable carbon atoms are hydrogenated. The hydrogenatable carbon atoms are the olefinic carbon atoms and the carbon atoms bearing hydroxyl groups. Preferably from about 50 to 60% of the hydrogenatable carbon atoms are hydrogenated in the partially hydrogenated products.

Hydrogenation can be achieved by reacting the tackifier resin described above, in a suitable hydrogenation reaction medium (if desired) and a hydrogen atmosphere in a suitable pressure-resistant vessel in the presence of a suitable hydrogenation catalyst. The hydrogenation temperature can vary between about 50° C and 275° C, although temperatures in the range of 100° C to about 250° C are preferred. Hydrogen gas pressure from about 500 to about 4000 psig (preferably 1000 to 2500) will produce an adequate rate of hydrogenation.

The hydrogenation reaction vessel should be capable of withstanding the hydrogenation temperature and pressure and is constructed of a material that is non-reactive with the starting materials and product. Such vessels are generally made of stainless steel. The vessel should be fitted with a stirrer to agitate the reactants, a temperature sensing device to observe the hydrogenation reaction temperature, an inlet line with a valve to introduce hydrogen into the vessel, an exhaust line with a valve to vent the vessel after the hydrogenation reaction is completed, and a pressure-sensing device to observe the hydrogen pressure.

Hydrogenation is achieved by first purging the hydrogenation vessel with a dry inert gas as dry nitrogen and then charging it with the resin described above, reaction medium, and catalyst, sealing the vessel, commencing stirring, pressurizing the vessel with hydrogen, heating to the appropriate temperature, and continuing to heat (and to stir) the vessel until the reaction is complete. The time required is generally about 2 to 24 hours but this may vary. Partial hydrogenation may be achieved at shorter hydrogenation times (e.g., 0.1 to 3 hours) while substantially complete hydrogenation requires longer reaction times (e.g., 2 to 24 hours).

Useful hydrogenation reaction media includes saturated hydrocarbon liquids such as cyclohexane, heptane, etc. The weight ratio of reaction medium to resin plus catalyst will generally be from about 1:1 to 10:1 or higher. The preferred hydrogenation catalyst is Raney nickel, although others (e.g., platinum, ruthenium, nickel complexes with aluminum, e.g., nickel 2-hexonate/diethyl aluminum reaction product and amines, etc.) may also be useful.

The partially hydrogenated product is a white friable solid which has a glass transition temperature in the range of 70° C to 220° C and an average molecular weight in the range of about 600 to 6000. The partially hydrogenated product is extremely compatible with polyurethane rubbers and when blended therewith provide novel tackified polyurethane pressure-sensitive adhesive compositions. A useful polyurethane rubber is prepared by reacting a block copolymer of ethylene glycol and polypropylene glycol with polytetramethylene ether endcapped with tolylene diisocyante, in the presence of a suitable catalyst, until essentially all traces of isocyanate functionality are absent, and then reacting the reaction product thereof with trimethylol propane endcapped with tolylene diisocyanate. Other useful polyurethane resins are well known in the art.

The substantially completely hydrogenated product is extremely compatible with and will tackify natural rubbers such as milled pale crepe natural rubber, cis-polybutadiene rubber such as that sold under the trade designation "Ameripol CB220", styrene-butadiene rubbers such as that sold under the trade designation "Shell SBR 1011", block copolymers such as the block copolymer of styrene and isoprene such as those sold under the trade designations "Kraton 1107" and "1108", block copolymers of styrene and butadiene such as "Kraton 1101", and ethylene/propylene rubbers.

Understanding of the invention will be further facilitated by referring to the subsequent examples, which indicate, without thereby limiting, ways in which the invention may be practiced.

EXAMPLE 1

A 5 liter resin flask, fitted with a mechanical stirrer, a dropping funnel, a thermometer, a purge gas inlet, and a reflux condenser protected from the atmosphere by a calcium chloride drying tube, was first purged with dry argon to eliminate atmospheric contamination, and the gas flow thereafter maintained at a rate sufficient to preclude such contamination. Four moles (376 grams) of phenol was then charged into the flask and heated therein to about 100° C. Thereafter, 7.5 ml $BF_3(CH_3COOH)_2$ was added in one batch with sufficient agitation to produce a homogenous mixture. Next, 2 moles (264 grams) of dicyclopentadiene was slowly added with the dropping funnel over a 1½ hour period of time, maintaining the resultant exotherm at about 130° C. Upon completion of the addition of the dicyclopentadiene, the contents of the flask were heated at 130° C for an additional 3 hours with stirring. After about 1 hour of the subsequent heating period, about 700 ml of xylene and 7.5 ml of $BF_3(CH_3COOH)_2$ were added to facilitate the reaction.

Upon completion of the first reaction, as evidenced by the temperature dropping to about 100° C, 8 moles of t-butylstyrene (1280 ml) was added dropwise, causing an exotherm which was maintained at 130° C. The t-butylstyrene was added over a period of 1 to 2 hours whereafter the contents of the flask were heated at 130° C with agitation for an additional 3 hour period.

Upon completion of the reaction, the reflux condenser and the dropping funnel were removed and the reaction flask was fitted for distillation. The xylene, catalyst, unreacted starting materials, and low boiling products were distilled off at a pressure of about 2–3 mm of Hg with heating to 250° C, leaving a dark brown resinous product weighing about 1765 grams (92% yield). The product was found to have a glass transition temperature (Tg) of 58° C, a weight average molecular weight ($\overline{M}w$) of 1,870, a number average molecular weight ($\overline{M}n$) of 1,090 and a weight average:number average ratio of 1.71:1.

The number average molecular weight and weight average molecular weight were determined by gel permeation chromatography utilizing a Waters Associates and Company gel permeation chromatograph. The glass transition temperature was determined by differential thermal analysis using an E.I. duPont deNemours Co. differential thermal analysis device by the method described by Mauer in *Chemical Rubber and Technology*, v. 42, No. 1 (1969), the chapter entitled "Applications of Differential Thermal Analysis and Thermogravimetric Analysis to Elastomer Systems".

The Table below, relating to Examples 2–7, reveals some pertinent physical properties of additional resin tackifiers prepared according to the method described in Example 1 of the reactants that are shown.

TABLE 1

| Ex. No. | Resin | Molar Ratio | Mw | Mn | Mw/Mn | Tg °C |
|---|---|---|---|---|---|---|
| 2 | Phenol/DCPD*/ vinyl toluene | 2/1/4 | 1,210 | 650 | 1.85 | 14 |
| 3 | Phenol/DCPD*/ indene | 2/1/4 | 1,100 | 550 | 2.00 | 53 |
| 4 | Phenol/DCPD*/ cyclohexene | 2/1/4 | 2,680 | 980 | 2.72 | 82 |
| 5 | Phenol/DCPD*/ styrene | 2/1/4 | 1,630 | 750 | 2.17 | 19 |
| 6 | Phenol/DCPD*/ α-methyl-styrene | 2/1/4 | 1,880 | 890 | 2.11 | 49 |
| 7 | Bisphenol-A/ DCPD*/t-butylstyrene | | 752 | 536 | 1.4 | 50 |

*Dicyclopentadiene

Hydrogenated resins according to the invention were prepared by dissolving the resins prepared as Examples 1–7 at about 20% solids in cyclohexane, charging the solution into a stainless steel hydrogenation reaction vessel fitted with a thermocouple, pressure gauge, stirrer, hydrogen gas inlet, and exhaust valve, adding Raney nickel catalyst (0.1 g per gram of resin), sealing the vessel, and pressurizing with about 1200–2500 psi of hydrogen gas. Thereafter the reaction vessel was heated to 250° C with stirring to produce the desired degree of hydrogenation. Hydrogenated products (Examples 8–14) are shown in Table 2 below.

TABLE 2

| Ex. No. | Resin | Mw | Mn | Mw/Mn | Tg °C |
|---|---|---|---|---|---|
| 8 | Phenol/DCPD*/t-butylstyrene | 1,920 | 1,120 | 1.72 | 42 |
| 9 | Phenol/DCPD*/ vinyl toluene | 1,650 | 840 | 1.97 | 2 |
| 10 | Phenol/DCPD*/ | | | | |

TABLE 2-continued

| Ex. No. | Resin | Mw | Mn | Mw/Mn | Tg °C |
|---|---|---|---|---|---|
| | indene | 1,030 | 525 | 1.97 | 26 |
| 11 | Phenol/DCPD*/ cyclohexene | 2,050 | 629 | 3.26 | 21 |
| 12 | Phenol/DCPD*/ styrene | 1,370 | 720 | 1.90 | −5 |
| 13 | Phenol/DCPD*/ α-methylstyrene | 1,615 | 700 | 2.30 | 5 |
| 14 | Bisphenol A/DCPD*/ t-butylstyrene | 620 | 450 | 1.39 | 24 |

*Dicyclopentadiene

The resins of the Examples were evaluated as tackifiers in pressure-sensitive adhesive compositions for adhesive coated tapes by dissolving the resin in a solvent such as heptane and then dissolving a rubber base material in the resin solution to form a homogenous blend, forming approximately a 20% solids solution therein, and coating the solution on 2 mil polyester film to provide a dried coating thickness of 2 mils (and 1 mil polyester film with a 1 mil coating thickness). Thereafter, the coated film was examined and subjective evaluation of film appearance, quality of film, and tack were determined.

In an adhesive coated transparent tape, it is desired to have a clear rather than a hazy film appearance. Likewise, the film should not be cracked or show other signs of discontinuity. Additionally, the pressure-sensitive adhesive should be tacky without being unduly soft.

The terms "tacky", "some tack" and "nil" relate to the degree of tack noted when a hand-held 1.6 mm diameter stainless steel probe was touched to the surface of a 4 by 6 inch by 1 mil adhesive layer on a 1 mil polyester sheet, as the probe is withdrawn. "Tacky" means the entire sheet was lifted and remained on the end of the probe. "Some tack" means the sheet was lifted slightly but it subsequently fell off the end of the probe. "Nil" means the sheet was not lifted by the probe. (Comparison with tack measurements determined by ASTM Method D2979-71 reveals adhesives found to be "tacky" by the above-described test have withdrawal force values from 35 to 110 grams.)

The subjective evaluations of the pressure-sensitive adhesives are shown in Table 3 below.

TABLE 3

| Ex. No. | Rubber Base Material | Resin Ex. No. | Amount of Resin (as Parts Resin per 100 Parts Rubber) | Film Appearance | Quality of Film | Tack |
|---|---|---|---|---|---|---|
| 15 | natural rubber | 1 | 30 | yellow trans.* | good | tacky |
| 16 | " | 1 | 40 | orange trans. | " | " |
| 17 | " | 1 | 50 | " | " | some tack |
| 18 | cis-polybutadiene | 1 | 30 | orange hazy | " | tacky |
| 19 | " | 1 | 40 | " | cratered | " |
| 20 | " | 1 | 50 | " | " | some tack |
| 21 | natural rubber | 2 | 30 | red trans. | good | " |
| 22 | " | 2 | 40 | " | " | " |
| 23 | " | 2 | 50 | " | " | " |
| 24 | cis-polybutadiene | 2 | 30 | " | " | tacky |
| 25 | " | 2 | 40 | " | rough | " |
| 26 | " | 2 | 50 | " | " | some tack |
| 27 | natural rubber | 3 | 30 | " | good | " |
| 28 | " | 3 | 40 | " | " | " |
| 29 | " | 3 | 50 | " | " | nil |
| 30 | cis-polybutadiene | 3 | 30 | red transparent | rough | some tack |
| 31 | " | 3 | 40 | " | " | nil |
| 32 | " | 3 | 50 | " | " | " |
| 33 | natural rubber | 4 | 30 | " | good | nil |
| 34 | " | 4 | 40 | " | " | " |
| 35 | " | 4 | 50 | " | " | " |
| 36 | cis-polybutadiene | 4 | 30 | " | rough | slight tack |
| 37 | " | 4 | 40 | " | good | " |
| 38 | " | 4 | 50 | " | " | " |
| 39 | natural rubber | 5 | 30 | " | " | some tack |
| 40 | " | 5 | 40 | " | " | " |
| 41 | " | 5 | 50 | " | " | " |
| 42 | cis-polybutadiene | 5 | 30 | " | fair | " |
| 43 | " | 5 | 40 | " | rough | " |
| 44 | " | 5 | 50 | " | " | slight tack |
| 45 | natural rubber | 6 | 30 | red transparent | good | some tack |
| 46 | " | 6 | 40 | " | " | nil |
| 47 | " | 6 | 50 | " | " | " |
| 48 | cis-polybutadiene | 6 | 30 | " | fair | some tack |
| 49 | " | 6 | 40 | " | rough | " |
| 50 | " | 6 | 50 | " | " | nil |
| 51 | natural rubber | 7 | 30 | trans. orange | good | tacky |
| 52 | " | 7 | 40 | " | " | some tack |
| 53 | " | 7 | 50 | " | " | " |
| 54 | cis-polybutadiene | 7 | 30 | " | rough | tacky |
| 55 | " | 7 | 40 | " | cratered | slight tack |
| 56 | " | 7 | 50 | " | orange peel | " |
| 57 | natural rubber | 8 | 30 | clear colorless | good | tacky |
| 58 | " | 8 | 40 | " | " | " |
| 59 | " | 8 | 50 | " | " | " |
| 60 | cis-polybutadiene | 8 | 30 | clear colorless | rough | tacky |
| 61 | " | 8 | 40 | " | " | " |
| 62 | " | 8 | 50 | " | good | " |
| 63 | natural rubber | 9 | 30 | colorless clear | " | " |
| 64 | " | 9 | 40 | " | " | " |
| 65 | " | 9 | 50 | " | " | " |
| 66 | cis-polybutadiene | 9 | 30 | " | " | " |
| 67 | " | 9 | 40 | " | rough | " |
| 68 | " | 9 | 50 | " | " | " |
| 69 | natural rubber | 10 | 30 | colorless trans. | good | " |
| 70 | " | 10 | 40 | " | " | " |
| 71 | " | 10 | 50 | " | " | " |

TABLE 3-continued

| Ex. No. | Rubber Base Material | Resin Ex. No. | Amount of Resin (as Parts Resin per 100 Parts Rubber) | Film Appearance | Quality of Film | Tack |
|---|---|---|---|---|---|---|
| 72 | cis-polybutadiene | 10 | 30 | " | " | " |
| 73 | " | 10 | 40 | " | rough | " |
| 74 | " | 10 | 50 | " | good | " |
| 75 | natural rubber | 11 | 30 | colorless trans. | good | tacky |
| 76 | " | 11 | 40 | " | " | " |
| 77 | " | 11 | 50 | " | " | " |
| 78 | cis-polybutadiene | 11 | 30 | " | rough | " |
| 79 | " | 11 | 40 | " | good | " |
| 80 | " | 11 | 50 | " | " | " |
| 81 | natural rubber | 12 | 30 | " | " | " |
| 82 | " | 12 | 40 | " | " | " |
| 83 | " | 12 | 50 | " | " | " |
| 84 | cis-polybutadiene | 12 | 30 | " | rough | " |
| 85 | " | 12 | 40 | " | good | " |
| 86 | " | 12 | 50 | " | " | " |
| 87 | natural rubber | 13 | 30 | " | " | " |
| 88 | " | 13 | 40 | " | " | " |
| 89 | " | 13 | 50 | " | " | " |
| 90 | cis-polybutadiene | 13 | 30 | colorless trans. | rough | tacky |
| 91 | " | 13 | 40 | " | good | " |
| 92 | " | 13 | 50 | " | " | " |
| 93 | natural rubber | 14 | 30 | " | " | " |
| 94 | " | 14 | 40 | " | " | " |
| 95 | " | 14 | 50 | " | " | " |
| 95 | " | 14 | 50 | " | " | " |
| 96 | cis-polybutadiene | 14 | 30 | " | " | " |
| 97 | " | 14 | 40 | " | " | " |
| 98 | " | 14 | 50 | " | " | " |

*trans. is the abbreviation for transparent

What is claimed is:

1. A tacky adhesive composition comprising
   1. 5 to 200 parts by weight phenol-diene-olefin resin having a number average molecular weight between about 600 and about 6000, said resin being produced by first reacting about 2 moles of a phenol with about 1 mole of non-conjugated diene, and then reacting 1 to 4 moles of olefin with the reaction product, both reactions being carried out in an inert atmosphere, in the presence of a Friedel-Crafts catalyst, and at a temperature in the range of about 20° C to 180° C, wherein said phenol has at least 2 ortho and/or para positions free for reaction, and wherein said olefin is selected from the group consisting of styrene, α-methylstyrene, chlorostyrene, vinyltoluene, t-butylstyrene, hexene-1, hexene-2, octene-1, 2-ethylhexene-1, indene, cylohexene, methyl vinyl ether, isobutyl vinyl ether, allyl propyl ether, methyl cinnamate, dimethyl fumarate, N-vinylpyridine, N-vinylpyrrolidone, and N-vinylcarbazole, and
   2. about 100 parts by weight of a rubbery material selected from the group consisting of natural rubber and cis-polybutadiene.

2. A tacky adhesive composition comprising
   1. 5 to 200 parts by weight phenol-diene-olefin resin having a number average molecular weight between about 600 and about 6000, said resin being produced by first reacting about 2 moles of a phenol with about 1 mole of non-conjugated diene, and then reacting 1 to 4 moles of olefin with the reaction product, both reactions being carried out in an inert atmosphere, in the presence of a Friedel-Crafts catalyst, and at a temperature in the range of about 20° C to 130° C, wherein said phenol has at least 2 ortho and/or para positions free for reaction, wherein said olefin is selected from the group consisting of styrene, α-methylstyrene, chlorostyrene, vinyltoluene, t-butylstyrene, hexene-1, hexene-2, octene-1, 2-ethylhexene-1, indene, cyclohexene, methyl vinyl ether, isobutyl vinyl ether, allyl propyl ether, methyl cinnamate, dimethyl fumarate, N-vinylpyridine, N-vinylpyrrolidone, and N-vinylcarbazole, and wherein at least half of the olefin carbon atoms and carbon atoms having hydroxyl groups of said resin are hydrogenated, and
   2. about 100 parts by weight of a polyurethane rubbery material.

3. A tacky adhesive composition comprising 5 to 200 parts by weight phenol-diene-olefin resin having a number average molecular weight between about 600 and about 6000, said resin being produced by first reacting about 2 moles of a phenol with about 1 mole of non-conjugated diene, and then reacting 1 to 4 moles of olefin with the reaction product, both reactions being carried out in an inert atmosphere, in the presence of a Friedel-Crafts catalyst, and at a temperature in the range of about 20° C to 130° C, wherein said phenol has at least 2 ortho and/or para positions free for reaction, wherein said olefin is selected from the group consisting of styrene, α-methylstyrene, chlorostyrene, vinyltoluene, t-butylstyrene, hexene-1, hexene-2, octene-1, 2-ethylhexene-1, indene, cyclohexene, methyl vinyl ether, isobutyl vinyl ether, allyl propyl ether, methyl cinnamate, dimethyl fumarate, N-vinylpyridine, N-vinylpyrrolidone, and N-vinylcarbazole, and wherein said resin is substantially completely hydrogenated, and
   2. about 100 parts by weight of a rubbery material selected from the group consisting of natural rubber, cis-polybutadiene rubber, styrene-butadiene rubber, block copolymers of styrene with butadiene or isoprene and ethylene propylene rubbers.

4. The adhesive composition of claim 1 wherein said phenol is selected from the group consisting of phenol, anisol, cresol, naphthol, butylphenol, t-amylphenol, octylphenol, bisphenol A and bisphenol B.

5. The tacky adhesive composition of claim 1 wherein said diene is selected from the group consisting of dicyclopentadiene, 4-vinylcyclohexene-1, dipentene, and 1,5-cyclooctadiene.

6. An article comprising a flat self-supporting strip bearing a thin layer of the tacky adhesive composition of claim 1 on at least one surface thereof.

7. An article comprising a flexible self-supporting strip bearing a thin layer of the tacky adhesive composition of claim 3 on one major surface thereof.

8. The tacky adhesive composition of claim 1 wherein said resin is the reaction product of phenol, dicyclopentadiene, and tertiary butyl styrene.

9. Phenoldiene-olefin resin having a number average molecular weight between about 600 and about 6000, said resin being produced by first reacting about 2 moles of a phenol with about 1 mole of non-conjugated diene, and then reacting 1 to 4 moles of olefin with the reaction product, both reactions being carried out in an inert atmosphere, in the presence of a Friedel-Crafts catalyst, and at a temperature in the range of about 20° C to 130° C, wherein said phenol has at least 2 ortho and/or para positions free for reaction and wherein said olefin is selected from the group consisting of styrene, α-methylstyrene, chlorostyrene, vinyltoluene, t-butylstyrene, hexene-1, hexene-2, octene-1, 2-ethylhexene-1, indene, cyclohexene, methyl vinyl ether, isobutyl vinyl ether, allyl propyl ether, methyl cinnamate dimethyl fumarate, N-vinyl-pyridine, N-vinylpyrrolidone, and N-vinylcarbazole.

10. The resin of claim 9 wherein said phenol is selected from the group consisting of phenol, anisol, cresol, naphthol, butylphenol, octylphenol, t-amylphenol, bisphenol A and bisphenol B.

11. The resin of claim 9 wherein said diene is selected from the group consisting of dicyclopentadiene, 4-vinylcyclohexene-1, dipentene, and 1,5-cyclooctadiene.

12. The resin of claim 9 wherein at least half of the olefin carbon atoms and carbon atoms bearing hydroxyl groups are hydrogenated.

* * * * *